INVENTOR
HENRY RUELLAND
BY
ATTORNEY

United States Patent Office 2,800,017
Patented July 23, 1957

2,800,017

RECORDING DEVICE FOR A PLURALITY OF INSTANTANEOUS FLOWS AS A FUNCTION OF A PLURALITY OF FLOWN VOLUMES

Henry Ruelland, Saint-Germain-en-Laye, France, assignor to Institut de Recherches de la Sidérurgie, Saint-Germain-en-Laye, France, a professional institution Application January 30, 1953, Serial No. 334,296

Claims priority, application France May 14, 1952

3 Claims. (Cl. 73—195)

This invention relates to a device of the volume flow recorder type, recording a plurality of instantaneous flows as a function of a plurality of flown volumes, which may be used for various applications, and may make the operation of a Thomas or Bessemer converter easier, when blowing with oxygen-enriched air.

In fact oxygen-enriched air, which is composed of ordinary air with added oxygen, is readily used when refining molten pig iron in a Thomas or Bessemer converter. In this case the scientific control of the blowing is based more particularly on the rate at which oxygen is introduced. The total oxygen blown into the converter is evidently the sum of the oxygen contained in the air and of the oxygen added.

In operation, the concentration of total oxygen in the blast varies frequently. Use of a sole flowmeter for measuring the total oxygen or total blast flow is impossible. It is known that the measurement of a flow in a pipe finally corresponds to the measurement of a pressure difference produced on each side of a diaphragm provided in said pipe. This pressure difference is in direct ratio to the square of the rate of flow and with the specific weight of the fluid. Since the concentration of oxygen varies, the specific weight of the oxygen-enriched blast varies also. For that reason, a measurement with a sole flowmeter would be erroneous.

On the other hand, the conventional flowmeters fitted with recorders permit the recording only of the curve of flow as a function of time. In the case of a Thomas or Bessemer converter, particularly, the variable time is less important than the volume of total oxygen or total wind introduced since the start of the operation.

Consequently, the scientific control of the blowing of a Thomas or Bessemer converter with oxygen-enriched blast requires an apparatus adapted to record the instantaneous flow of total oxygen or total blast through the converter as a function of the volume of total oxygen or total blast, between the start of the operation and the time which is considered.

It is a fact that known apparatus, such as meters and flowmeters, may be used to obtain a graph giving the variations of the instantaneous flow of total oxygen or total blast as a function of the volume of total oxygen or total blast, between the start of the operation and the time which is considered.

The meters would give a graph of the volume of total oxygen or total blast, as a function of time, and the flowmeters would give a graph of the instantaneous flow of total oxygen or total blast, also as a function of time. Consequently, by simply eliminating the variable, time between the two said graphs, it would be rather simple to obtain a series of points and to draw by hand the graph of the instantaneous flow of total oxygen or total blast as a function of the flow volume of total oxygen or total blast.

But it is obvious that such a method would be tedious. Furthermore, it would produce the desired curve only a posteriori, i. e. at the end of the blowing operation, and it would thus not be possible to make necessary adjustments of the air and/or oxygen flows during the operation.

The main object of the present invention is to provide a device for automatically recording the above-mentioned graph for use in connection with converter and other operations.

Another object of the invention is to provide a recording device for a plurality of instantaneous flows as a function of a plurality of volumes flown between two moments.

Another object of the invention is to provide a device for recording an algebraic sum of values in direct ratio with the fluid flows in any number of conduits as a function of an algebraic sum of values in direct ratio with the volumes of fluid flown in said conduits, said device comprising flowmeters respectively connected to each said conduit and coordinating means, linked to one another and to said flowmeters.

A further object of the invention is to provide a device of the above mentioned character wherein flowmeters are arranged to drive synchro-transmitters and differential synchro-transmitters.

Another object of the invention is to provide a device of the above mentioned character wherein the angular indications of synchro-transmitters and differential synchro-transmitters are transmitted to a synchro-transformer receiver adapted to control at least one movable recording element or an electromagnetic coupling, in order to record the curve of flow as a function of the flown volumes.

Other objects and advantages of the invention will be apparent during the course of the following description, which relates to the specific example of blowing a Thomas converter with oxygen-enriched air. In order to control this blowing operation scientifically, it is necessary to know at each moment the graph of the instantaneous flow of total oxygen, i. e. of the oxygen contained in the blown air plus the oxygen added, as a function of the volume of total oxygen flown since the start of the operation.

In the accompanying drawings forming a part of this specification, and in which like numerals are employed to designate like parts throughout the same:

In this drawing, the device comprises essentially: two flowmeters 1 and 2 comprising each respectively two synchro-transmitter devices $3a$, $4a$ and differential synchro-transmitter devices $3b$, $4b$ corresponding to a circuit of total oxygen ($3a$, $3b$) and to a circuit of total blast ($4a$, $4b$); two synchro-transformers 5, 6; and finally two recording devices 7, 8.

Figure 1:
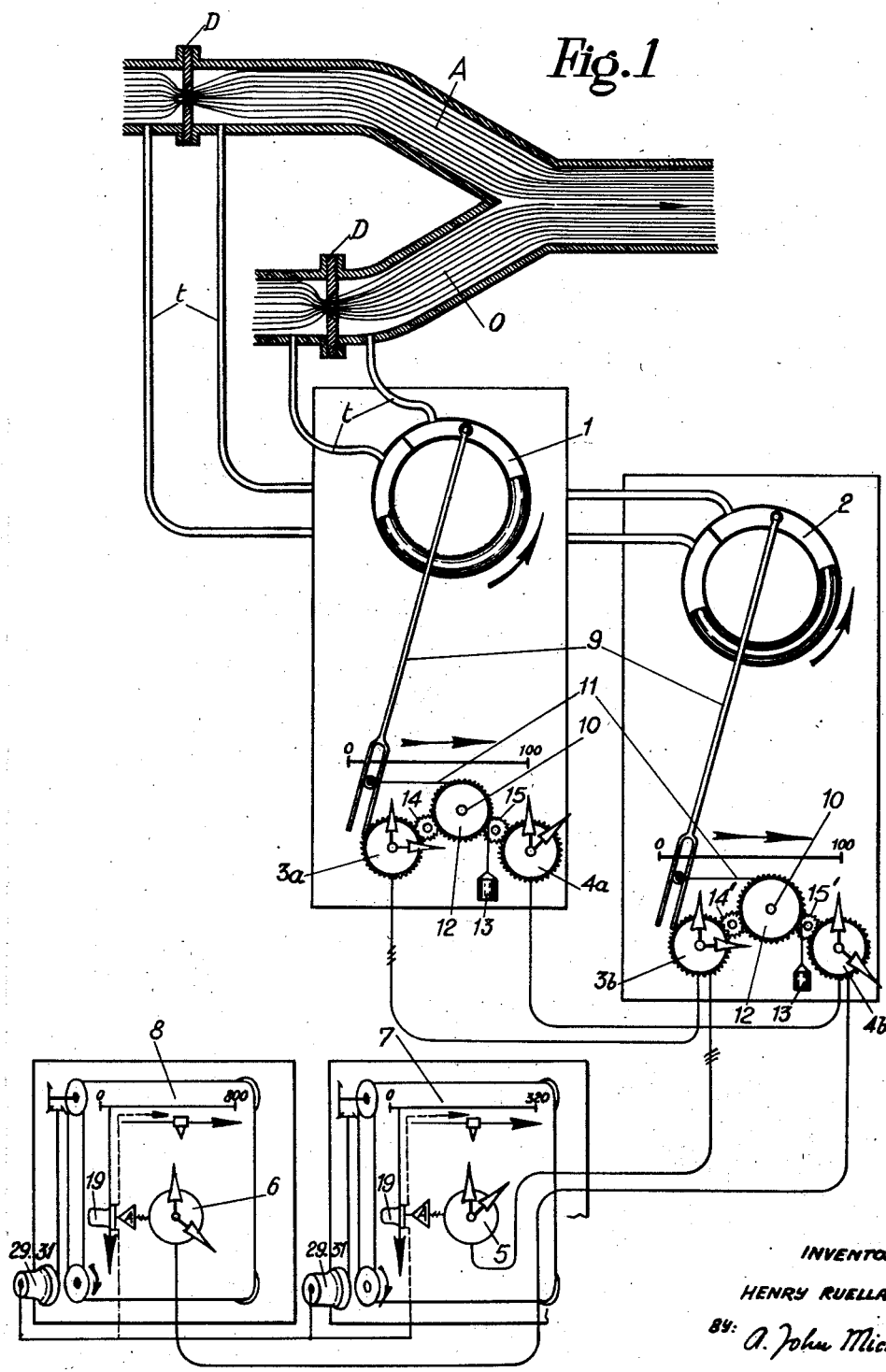
Fig. 1 shows diagrammatically the whole arrangement of a recording device connected to the air pipe and oxygen pipe of a Thomas converter.

The flowmeters 1 and 2 are, for instance, what we call blind flowmeters, i. e. they comprise neither dial nor recording parts, the first flowmeter being connected to an oxygen pipe O, and the second to an air pipe A, by means of conduits $t$. These flowmeters are preferably flowmeters in which the pressure is automatically adjusted, such as ring balance or U-tube meters, modified in such a way that the indicating arm 9, instead of recording the flows on a chart drum, drives synchro-transmitters $3a$, $4a$, and differential synchro-transmitters $3b$, $4b$ which rotate by means of intermediate driving shafts 10, 10. Strings 11, 11 wound about pulleys 12, 12 secured on the driving shafts 10, 10 and stretched by counterweights 13, 13 are used as a mechanical link between the indicating arms 9, 9 of the flowmeters, gears 14, 14′, 15, 15′ and gears $3a$, $4a$, $3b$, $4b$ of the synchro-transmitters. In Fig. 1, it has been supposed that flows of both fluids are equal and gears 3b, 4b have the same diameter. But, in the case of Bessemer converters, it would be necessary to add the flow of oxygen contained in the air to obtain the total oxygen flow. In that case, the ratio between gears 3b and 4b would be 0.208. The flow of total blast is obtained by adding the air flow and the oxygen flow.

The gear ratios are calculated in the following manner, considering that a given unit volume of air contains 0.208 unit volume of oxygen:

Designating $Q_A$ as the maximum air flow, $Q_O$ as the maximum flow of pure oxygen, $Q_V$ as the maximum flow of total blast and $Q_{OT}$ as the maximum flow of total oxygen, the recording device 7 will indicate $$Q_{OT} = 0.208 Q_A + Q_O$$

and volume recording device 8 will indicate $$Q_V = Q_A + Q_O$$

If $\alpha_1, \beta_1$ are the maximum angles of rotation of synchro-transmitters 3a, 3b and $\alpha_2, \beta_2$ those of synchro-transmitters 4a, 4b, the two flows cannot be added together unless the same measuring unit is used to evaluate them, which leads to the following equation between the flows and the maximum angles of rotation:

$$\frac{0.208 Q_A}{\alpha_1} = \frac{Q_O}{B_1} = \frac{Q_{OT}}{\alpha_1 + B_1}$$

$$\frac{Q_A}{\alpha_2} = \frac{Q_O}{B_2} = \frac{Q_V}{\alpha_2 + B_2}$$

The apparatus is designed for a predetermined maximum content of total oxygen in the total blast, the ratio being $$\eta = \frac{Q_{OT}}{Q_V}$$

Since it is logical to use the total width of the recording band for $Q_{OT}$ and $Q_V$, which implies that $$\alpha_1 + \beta_1 = \alpha_2 + \beta_2$$

it is easy to deduce that the relation which must exist between the different rotations is given by $$\eta = \frac{0.208 \alpha_2}{\alpha_1} = \frac{B_2}{B_1}$$

Thus, when $\eta$ is given, the gear ratios are known. For instance, if, in a typical embodiment, $\eta$ is 0.40, $$0.40 = \frac{0.208 \times 250}{130} = \frac{80}{200}$$

Figure 2:
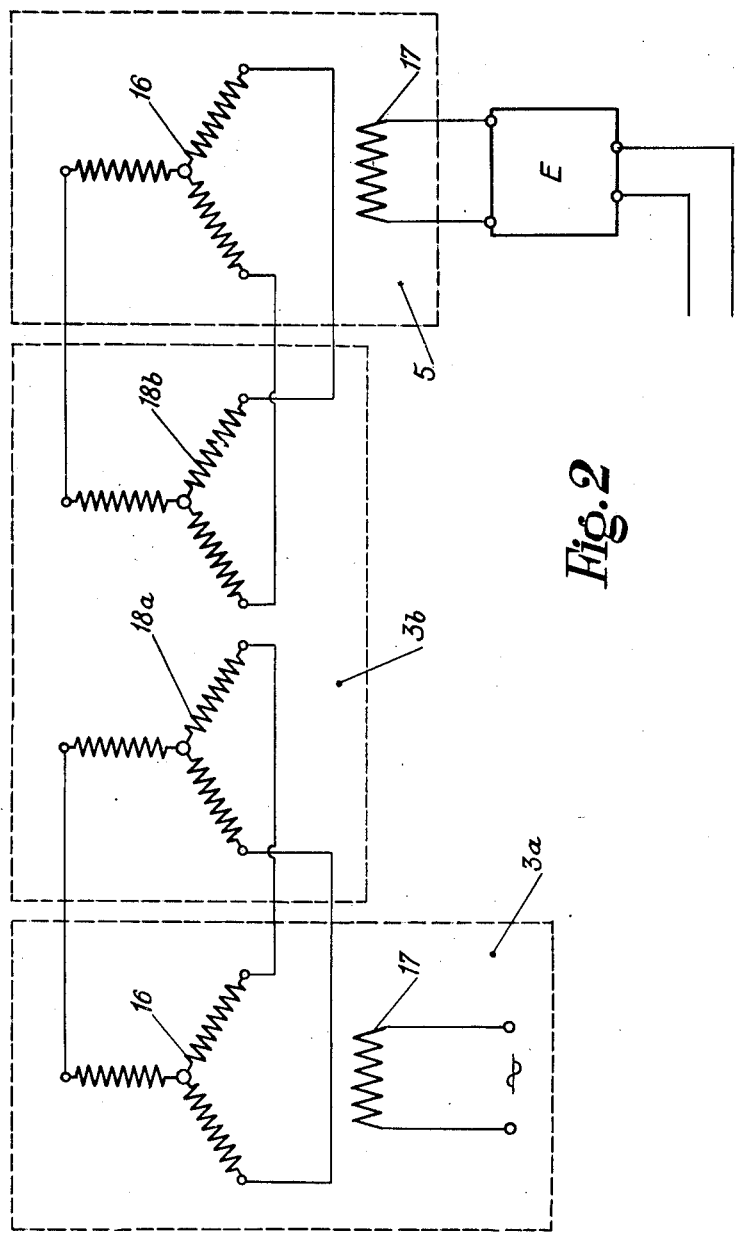
Fig. 2 shows the connection layout of the electrical coordinating parts of this device.

The synchro-transmitters and synchro-transformers (Fig. 2) are each composed of electric parts comprising a three-phase stator 16 and a one-phase rotor 17. The differential synchro-transmitters are each composed of a three-phase stator 18a and a three-phase rotor 18b. The rotor 17 of synchro-transmitter 3a of flowmeter 1, for instance, is fed by the electric alternating current network of the plant where the apparatus is used. The voltage obtained in the stator 16 of this synchro-transmitter is a function of the angle corresponding to the rotation of rotor 17. The phases of stator 16 are connected one to another with the phases of the stator of the corresponding differential synchro-transmitter, that is synchro-transmitter 3b of flowmeter 2, and the phases of the rotor of said differential synchro-transmitter are connected one to another with the phases of the stator 16 of synchro-transformer 5. The voltage obtained in the stator 16 is a function of the angles corresponding to the rotations of the rotors of the synchro-transmitter and differential synchro-transmitter, and the rotor 17 of the synchro-transformer 5 generates a one-phase voltage in direct ratio with the sum of both angles of the synchro-transmitter and differential synchro-transmitter, that is with the sum of the respective flows corresponding to each pipe. The signal of this resulting voltage is transmitted to the recording parts after having passed through an amplifier E.

Figure 3:
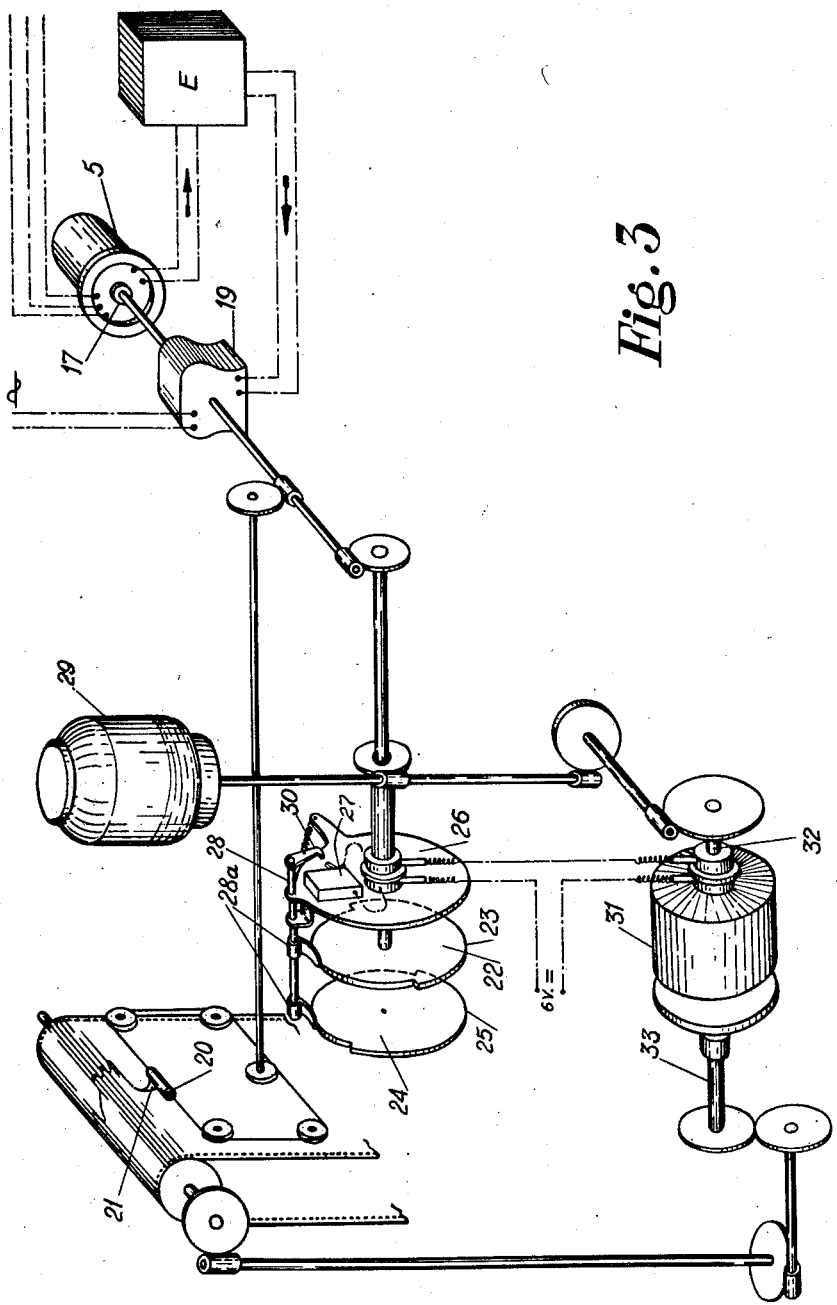
Fig. 3 illustrates the recording parts thereof.

The magnified voltage is applied to a small two-phase motor 19 (Fig. 3), the other phase of which is fed by the electric network, said motor being mechanically coupled with the rotor 17 of synchro-transformer 5, and starting to rotate, simultaneously driving a carriage 20 carrying a recording pen 21, the rotor 17 of the synchro-transformer 5 and a disc 22, the function of which will be explained later on.

The motor 19 will stop when it receives no more voltage on its "measuring phase," that is when it has driven the rotor 17 of the synchro-transformer 5 to its position at balance, in such a manner that the voltage induced in said rotor is reduced to zero. At that time the rotor is maintained in its position at balance, and the recording pen indicates the sum of the partial flows taken on both fluid pipes, that is either of the total oxygen flow or the total blast flow, according to the algebraic sum which has been predetermined.

The disc 22 comprises on its half periphery a cam made of a boss 23. Another disc 24, which is stationary, has also on its half periphery a cam made of a boss 25. A third disc 26, carrying a switch 27 and an oscillating spindle 28, on which are mounted one or more rubbing dogs 28a, is driven by an independent synchronous motor 29, by means of a shaft co-axial with the shaft driving the disc 22. Motor 29 rotates permanently, thus enabling dogs 28a to follow the circumference of discs 22 and 24. The rubbing dogs 28a cause the oscillating spindle 28 to rotate when they are in contact with either boss 23 or 25, and a percussion member 30, fixed at the end of the spindle, to actuate the switch 27 and cut off the circuit of electromagnetic switch 31. According to the angle of rotation of motor 19, the rubbing dogs are in contact with bosses 23 and 25 for a period of a varied duration. The electric connection of the switch is such that when the percussion member actuates the switch the electric contact is broken. On the contrary, the electric circuit passing through said contact is closed when the rubbing dogs do not meet any boss. In this way the duration of that electric contact is a function of the angle of rotation of motor 19, and consequently is in direct ratio with the total oxygen or total blast flow.

For example, if the instantaneous flow equals 100%, bosses 23 and 25 are one in front of the other along an arc of 180°, removing the rubbing dogs 28a for half the time necessary to explore the circumference by means of disc 26. For the other half of the time, the rubbing dogs 28a will release the percussion member 30, enabling the current to energize electromagnetic switch 31 by means of switch 27.

If the instantaneous flow equals 50%, the boss 23 is shifted 90° and the time during which the rubbing dogs 28a are not engaged by the bosses is lowered to the time necessary for exploring a quarter of the circumference.

Finally, if the instantaneous flow equals zero, the two bosses 23 and 25 are shifted 180° and the rubbing dogs 28a never release the percussion member 30.

This electric contact closes a circuit which may energize a small electro-magnetic clutch 31 for the considered recording device, or a small electro-magnetic clutch 31 for the second recording device.

This coupling connects a driving shaft 32, which is actuated by the synchronous motor 29, with a shaft 33 actuating the chart. At each cycle of the disc 26, having a duration of about 5.6 seconds, the paper chart is thus driven for a duration which may vary between 0 and 2.8 seconds, said duration being in each case in direct ratio with the flow to be measured. Consequently when a certain time has lapsed, the paper chart is unwound in direct ratio with the flown volume.

It is obvious that the coil of the electro-magnetic clutch 31 of any recording device may be energized, either through the switch 27 of the recording device where it is located, or by the switch 27 of another recording device according to the combination of flown volumes which is required.

Thus, in the example described, one of the recording devices, which we shall call "recording device for total oxygen," draws the graph: "flow of total oxygen as a function of the volume of total oxygen." In fact, the voltage which is collected on the rotor 17 of the synchro-transformer 5 of said recording device is in direct ratio with the flow of "total oxygen" as it is shown in Figure 1, and consequently the synchro-transformer 5 controls, through the above-described device, both the motion of pen 21 and the energization of the electro-magnetic clutch 31 of the said recording device.

On the other hand, in the second recording device, which we shall call "recording device for total blast," we need a graph showing "flow of total blast as a function of the volume of total oxygen." In fact, the synchro-transformer 6 of this recording device delivers a voltage in direct ratio with the flow of "total blast" as shown in Figure 1. Consequently, the motion of pen 21 of said recording device is controlled by the synchro-transformer 6 of said recording device through the above-described device. But the electromagnetic clutch of this last recording device which must assure the unwinding of the paper chart as a function of the volume of total oxygen is controlled by the switch 27 of the recording device "total oxygen" in the same way as the clutch of the recording device "total oxygen."

Thus, it is clearly understood that, by means of the device according to the invention, it is possible to obtain any combination of flows and volumes of fluids flowing in any number of conduits to each of which is connected a flowmeter equipped with synchro-transmitters or differential synchro-transmitters, the number of which is predetermined by the combination of flows or volumes requested.

It is obvious that many variations and modifications may be resorted to by those skilled in the art without departing from the scope of the invention as disclosed in the present specification and defined by the appended claims.

What I claim is:

1. A recording device of the character described for recording an algebraic sum of values in direct ratio with fluid flows in any number of conduits, comprising in combination: flowmeters respectively connected to each conduit, each flowmeter having an indicating arm, an intermediate driving shaft connected to be driven by said indicating arm, at least one of said flowmeters having synchro-transmitters connected to be driven by the shaft of the respective flowmeter, and at least one flowmeter having differential synchro-transmitters connected to be driven by the shaft of the respective flowmeter, said synchro-transmitters and differential synchro-transmitters being electrically connected in such a manner that their angular indications are algebraically added; a number of recording means with a paper chart equal to the number of said flowmeters, said recording means comprising each a synchro-transformer having a tri-phase stator and a monophase rotor, said tri-phase stator being connected phase to phase to the rotor of the last differential synchro-transmitter of one of the chains of flowmeters constituting one of the elements entering in said algebraic sum, said monophase rotor being adapted to occupy an angular position which is in direct relation with said algebraic sum to avoid an actuating signal; an amplifier for receiving an actuating signal when said monophase rotor does not occupy said angular position; a two-phase motor one phase of which is directly connected to a network, the other phase of said two-phase motor being connected to said amplifier; a recording pen actuated by said two-phase motor; a switch; mechanical means to actuate said switch controlled by said two-phase motor; and electromechanical means including essentially an electromagnetic clutch for the corresponding recording means arranged to unwind said paper chart, said switch being connected to control an electric circuit for energizing said electromagnetic clutch.

2. The combination of claim 1 which comprises a pen carrier actuated by each synchro-transformer, a couple of rollers spaced apart in front of said pen carrier, said chart being wound about said couple of rollers, an independent synchronous motor to drive said rollers, a set of geared axles connecting said independent synchronous motor to said rollers, an electromagnetic coupling in said set of geared axles, and a mechanism actuated by said independent synchronous motor and controlled by said synchro-transformer to control the electromagnetic coupling.

3. The combination of claim 2 wherein the mechanism adapted to control the electromagnetic coupling comprises a first disc having a peripheral cam adapted to be driven by said synchro-transformer, a co-axial stationary disc having a peripheral cam, a third co-axial disc connected to be driven by an independent synchronous motor, a switch carried by said disc, a spindle having at least one rubbing dog rotatably mounted on said third disc, said dog being arranged to rub against said peripheral cams, a percussion member fixed at the end of said spindle and arranged to actuate said switch, an electric contact in said switch, an electric circuit including said contact and electromagnetic coupling whereby the duration of that contact controlling the electromagnetic coupling is a function of the angle of rotation of the first disc, which is in turn a function of the angle of rotation of the synchro-transformer.

References Cited in the file of this patent

UNITED STATES PATENTS

| | | |
|---|---|---|
| 398,821 | De Muth | Mar. 5, 1889 |
| 1,612,117 | Hewlett et al. | Dec. 23, 1926 |
| 2,076,442 | Borden | Apr. 6, 1937 |
| 2,085,224 | Krueger | June 29, 1937 |
| 2,229,195 | Smith | Jan. 21, 1941 |
| 2,371,253 | Moore | Mar. 13, 1945 |
| 2,394,972 | Beach et al. | Feb. 19, 1946 |
| 2,459,689 | Dickey et al. | Jan. 18, 1949 |

FOREIGN PATENTS

| | | |
|---|---|---|
| 612,841 | Great Britain | Nov. 18, 1948 |